(12) United States Patent
Kakstis et al.

(10) Patent No.: US 7,695,013 B2
(45) Date of Patent: Apr. 13, 2010

(54) DEPLOYMENT CONTROL DEVICE FOR AIRBAG

(75) Inventors: Kyle J. Kakstis, Warren, MI (US); Stephanie M. McFadden, Oxford, MI (US)

(73) Assignee: TK Holdings Inc., Auburn Hills, MI (US)

( * ) Notice: Subject to any disclaimer, the term of this patent is extended or adjusted under 35 U.S.C. 154(b) by 3 days.

(21) Appl. No.: 12/153,511

(22) Filed: May 20, 2008

(65) Prior Publication Data

US 2009/0289441 A1 Nov. 26, 2009

(51) Int. Cl.
*B60R 21/16* (2006.01)
(52) U.S. Cl. .................................... 280/743.1
(58) Field of Classification Search ............. 280/743.1, 280/730.2, 728.1
See application file for complete search history.

(56) References Cited

U.S. PATENT DOCUMENTS

| 5,765,867 | A * | 6/1998 | French .................. 280/743.2 |
| 6,070,904 | A * | 6/2000 | Ozaki et al. ............. 280/743.1 |
| 6,145,879 | A * | 11/2000 | Lowe et al. ............. 280/743.1 |
| 6,206,409 | B1 * | 3/2001 | Kato et al. ............... 280/728.2 |
| 7,125,037 | B2 * | 10/2006 | Tallerico et al. .......... 280/728.2 |
| 7,314,228 | B2 * | 1/2008 | Ishiguro et al. .......... 280/728.2 |

* cited by examiner

*Primary Examiner*—Faye M. Fleming
(74) *Attorney, Agent, or Firm*—Foley & Lardner LLP

(57) ABSTRACT

An airbag assembly for protecting a vehicle occupant includes an airbag and a deployment control device provided adjacent at least a portion of the airbag. The device includes a tear seam and is configured to restrain deployment of the airbag toward the occupant thereby causing the airbag to inflate laterally with respect to the occupant until the tear seam is torn by the force of the inflating airbag.

21 Claims, 4 Drawing Sheets

DEPLOYMENT CONTROL DEVICE FOR AIRBAG

BACKGROUND

The present application is related generally to airbags and airbag assemblies. More specifically, the present invention is related to airbag assemblies that include a member for restricting or altering the direction of deployment of an airbag.

Inflatable airbags have become standard equipment in modern automobiles. Such airbags typically include a bag portion that inflates when a predetermined condition is met (e.g., an automobile impact). Such airbags may be mounted in a steering wheel, in a portion of a dashboard, or in various other locations within the vehicle.

Conventional airbags used in vehicles are configured to inflate or deploy in the direction of a vehicle occupant. One issue with airbags that deploy in this manner is that in certain situations the impact of the airbag on the vehicle occupant may be greater than is desired. For example, in a front-mount or a mid-mount airbag installation, the deployment door of the airbag module may be directly in front of the chest of a relatively young child. In the event that the child is not properly positioned within the vehicle (e.g., has slid forward on a seat), the impact of the airbag on the chest of the child may be greater than would be desirable.

SUMMARY

The present application relates to an airbag assembly for protecting a vehicle occupant including an airbag and a deployment control device provided adjacent at least a portion of the airbag and having a tear seam. The device is configured to restrain deployment of the airbag toward the occupant thereby causing the airbag to inflate laterally with respect to the occupant until the tear seam is torn by the force of the inflating airbag.

The present application also relates to a system for controlling an airbag toward a vehicle occupant including a deployment control device having a first end coupled to an airbag module and a second end opposite of the first end coupled to the airbag module. A tear seam is located on the device between the first end and the second end thereof. Initial inflation of the airbag is towards a vehicle occupant until the airbag is restrained by the device. Further inflation of the airbag is laterally with respect to the occupant until the tear seam is torn.

The present application also relates to an airbag module for protecting a vehicle occupant including a folded airbag and a deployment control device wrapped around a central portion of the airbag to restrain deployment of the airbag in a direction toward the occupant. The deployment control device includes first and second tear seams. The device is configured so that the first tear seam tears as a result of the deploying airbag and after the first tear seam tears the deployment of the airbag remains restrained until the second tear seam tears allowing unrestricted deployment of the airbag.

It is to be understood that both the foregoing general description and the following detailed description are exemplary and explanatory only and are not restrictive of the invention as claimed.

BRIEF DESCRIPTION OF THE DRAWINGS

These and other features, aspects, and advantages of the present invention will become apparent from the following description, appended claims and the accompanying exemplary embodiments shown in the drawings, which are briefly described below.

DETAILED DESCRIPTION

Referring to the Figures, a system for restraining or altering the direction of inflation of an airbag is provided according to an exemplary embodiment. The system is positioned adjacent or proximate a portion of the folded airbag, and is configured to cause the airbag to inflate laterally or transversely to the direction in which it would normally inflate (e.g., the airbag normally would inflate in the direction of a passenger in a vehicle compartment of an automobile). After initial inflation of the airbag in the normal direction for a period of time, the airbag is then restrained to inflate in a direction lateral or transverse the passenger for a period of time. The airbag is then allowed to resume its normal inflation direction toward the passenger until the airbag is fully inflated. One advantageous feature of such an arrangement is that the amount of force transmitted to the vehicle occupant is reduced, since inflation of the airbag proceeds in a direction other than directly at the occupant.

Figure 1:
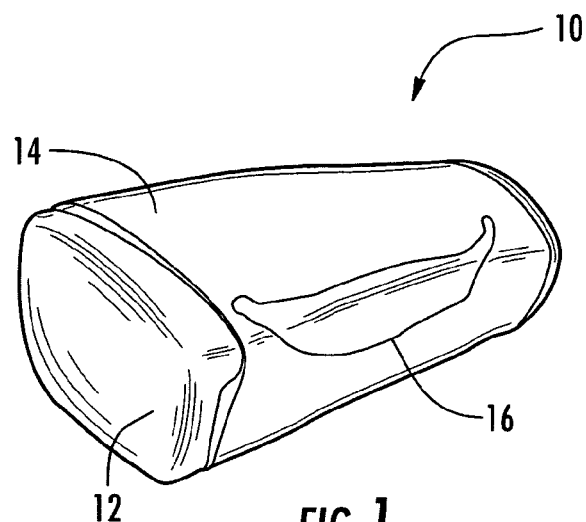
FIG. 1 is a perspective view of a folded airbag surrounded by a bag wrap according to an exemplary embodiment.
Figure 2:
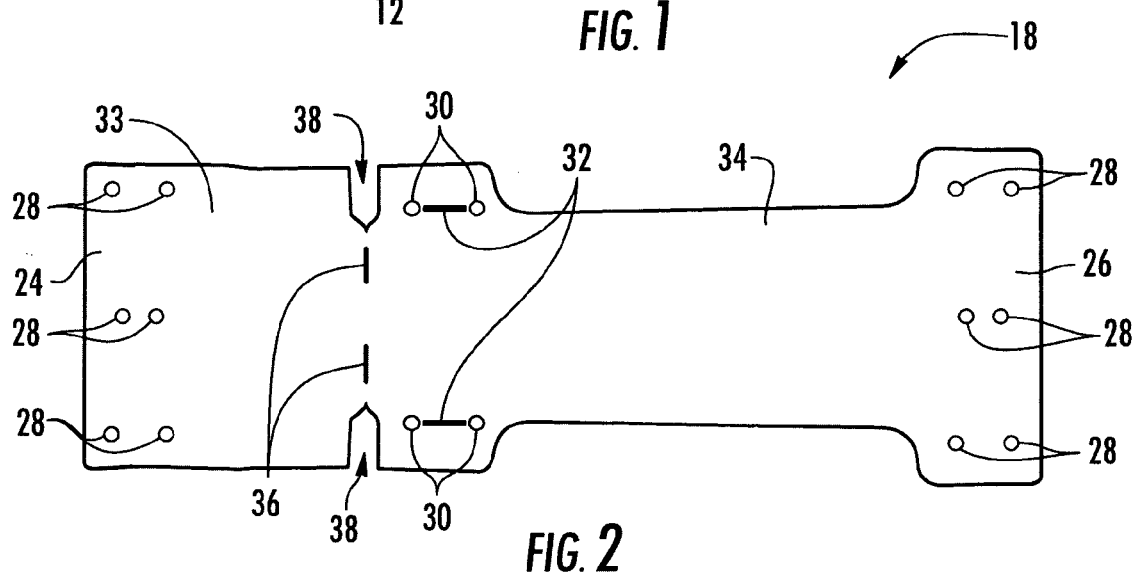
FIG. 2 is a plan view of a member or device for restraining the deployment direction of an airbag according to an exemplary embodiment.
Figure 7:
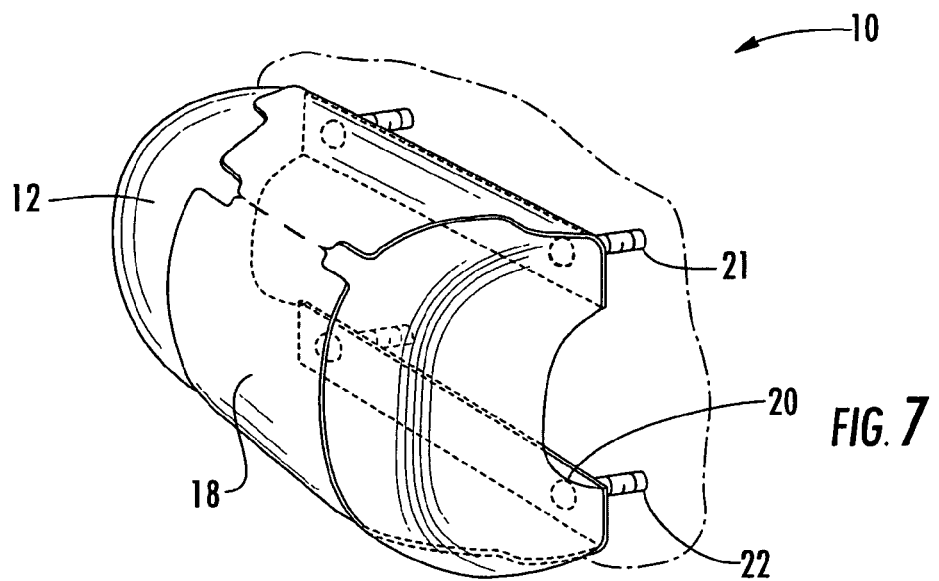
FIG. 7 is a perspective view of the assembled airbag assembly of FIGS. 3-6 prior to airbag deployment.

As shown in FIG. 1, an airbag assembly 10 includes an airbag 12 that prior to deployment is provided in a folded configuration. The airbag 12 is shown to be surrounded by a bag wrap 14 having a tear seam 16 as shown in FIG. 1. The bag wrap 14 is configured to keep the airbag 12 in a folded configuration up until deployment of the airbag 12. The bag wrap 14 is not intended to restrict deployment of the airbag 12 upon inflation. According to an alternative embodiment, the bag wrap 14 may be configured to restrict deployment of the airbag 14 upon deployment. According to an alternative embodiment, the airbag assembly 10 will not include a bag wrap 14 and instead will include a member or device 18 as shown in FIG. 7 to keep the airbag in a folded configuration up until deployment of the airbag.

The airbag 12 is shown in FIG. 1 coupled to a frame member shown as a retainer 20 having multiple projections shown as a first set of studs 21 and a second set of studs 22. Various components of the airbag assembly 10 are not shown in FIG. 1, although it will be appreciated by those of ordinary skill in the art that such components are present (e.g., device to inflate or deploy the airbag, an inflator or gas generator, etc.).

Figure 3:
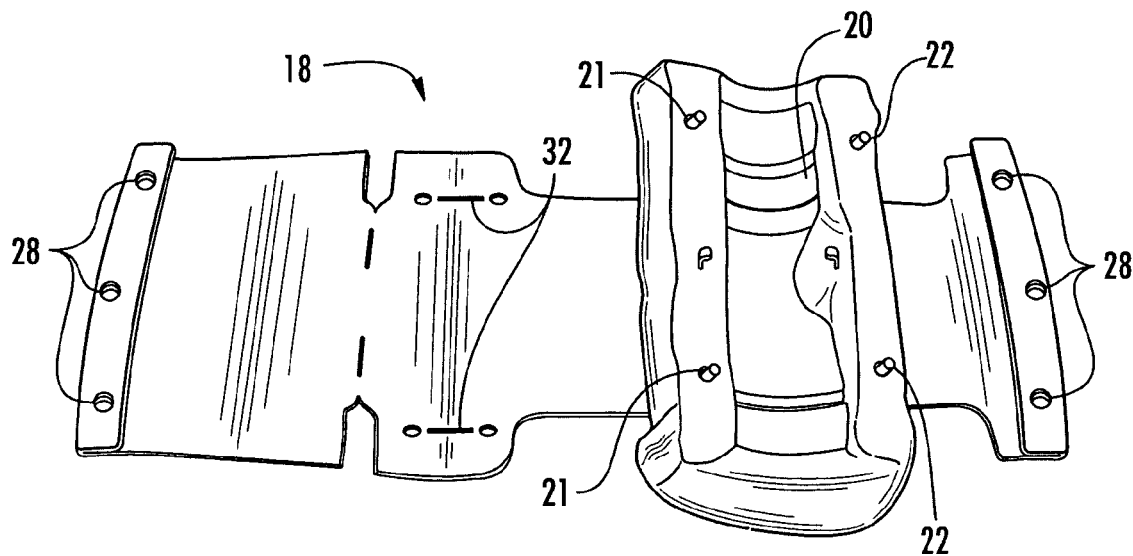
FIGS. 3-6 are perspective views of the device of FIG. 2 being installed in an airbag assembly according to an exemplary embodiment.

As shown in FIGS. 2-7 a member or device 18 is provided as part of an airbag assembly and is configured to alter, retain or restrain airbag deployment upon inflation. According to an exemplary embodiment, the device 18 is made of a fabric material such as nylon. According to other exemplary embodiments, the fabric material may be polyester or other woven or film materials. The device 18 is shown to have a first end 24 and a second end 26 opposite of the first end 24. A first set of multiple holes 28 are provided at each end of the device 18 to be used to attach or couple the device 18 to the retainer 20 of the airbag assembly 10. The multiple holes 28 are provided so that the device 18 may be folded at each end (as shown in FIGS. 3) so that the multiple holes 28 are aligned on top of each other to provide extra support and strength to the device 18. A second set of holes 30 are also provided near the middle of the device 18 between the first end 24 and the second end 26. These holes 30 are connected by tear seams 32 and the holes 30 are configured to attach to the retainer of the airbag assembly 10.

The device 18 is also shown to have a first portion 33 having a first width and a second portion 34 having a length and a second width different than the first width. The device 18 is also shown to include a tear seam 36 located in between the first end 24 and the second end 26 of the device 18. In the embodiment shown in the Figures, the tear seam 36 is located in the first portion 33 of the device 18. In alternative embodiments, the tear seam is located elsewhere. The tear seam 36 is shown in the Figures as slits in the fabric of the device 18. The tear seam 36 may also take the form of different configurations such as being a scoring in the device fabric or having a different shape such as a circular cutout or a series of circular cutouts. Adjacent the tear seam 36 is a cutout or notch 38 on either side of the device 18 configured to aid in directing the tear to occur at the tear seam 36. In the embodiment shown in the Figures the tear seam 36 is configured to be torn from outside the device 18 to inside the device 18. In an alternative embodiment, the device may be configured to be torn beginning on the inside of the device to the outside edge of the device.

Figure 4:
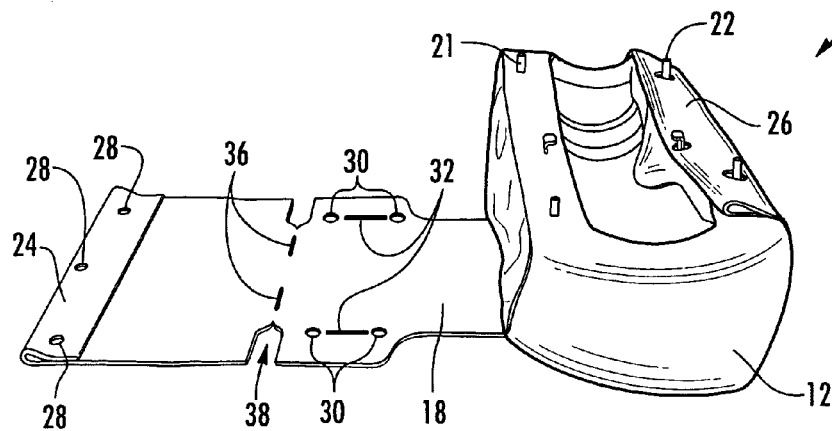
Figure 5:
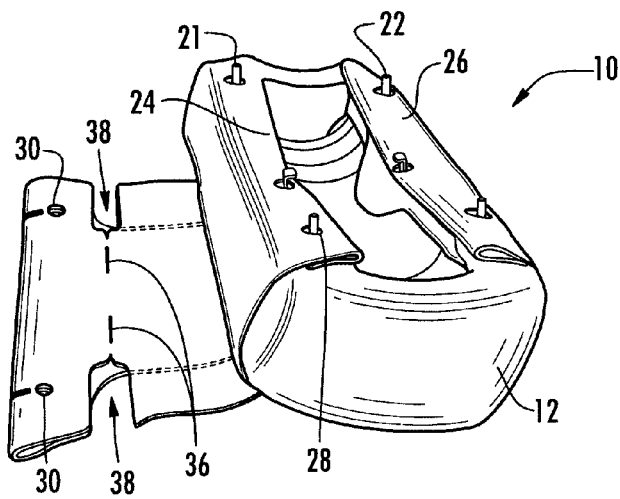
Figure 6:
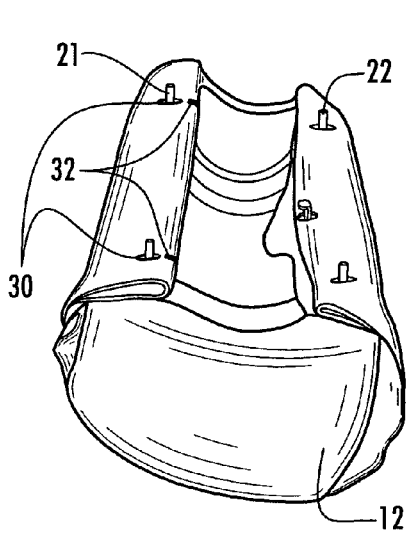

As shown in FIGS. 3-6, a method of assembling or attaching the device 18 to the airbag assembly 10 is shown. Referring to FIG. 3, the airbag assembly 10 is placed over or on top of the device 18 in the portion of the device 18 having the second (reduced) width. The ends of the device 18 are folded to align the first sets of multiple holes 28 above one another as explained above. Referring to FIG. 4, the multiple holes 28 of the second end 26 of the device 18 are placed over the second set of studs 22 of the airbag assembly 10. Referring to FIG. 5, the holes 28 of the first end 24 of the device 18 are placed over the first set of studs 21 of the airbag assembly 10 leaving the portion of the device 18 having the tear seam 36 and the second set of holes 30 (having tear seams 32 between the holes 30) to the side of the airbag assembly 10. Referring to FIG. 6, the remaining portion of the device 18 is folded with the second set of holes 30 being placed over or attached to the first set of studs 21 of the airbag assembly 10. In an alternative embodiment, the device may not include the second sets of holes (having tear seams between the holes) and the remaining portion of the device is left loose.

Figure 12:
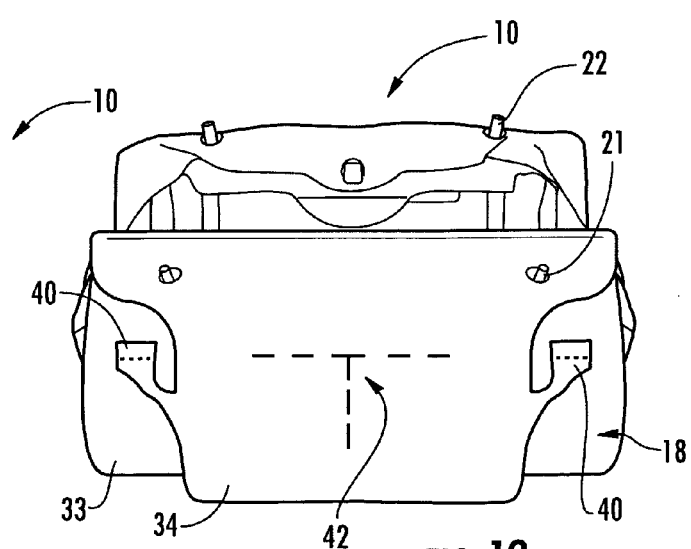
FIG. 12 is a perspective view of the assembled airbag assembly of FIGS. 3-6 including optional delay mechanisms according to an exemplary embodiment.

As shown in FIG. 12, the airbag assembly 10 is shown to include optional mechanisms for delaying the tearing of the tear seam 36. These delay mechanisms may take the form of tabs shown as temporary tear tabs 40, stitching shown as temporary tack stitches 42, or other appropriate features. These optional mechanisms (e.g., tear tabs 40 and stitching 42) may be used independently of one another or may be used concurrently. These optional mechanisms are designed to temporarily restrain the extension of the device 18 (and thus the forward deployment of the airbag 12) by delaying when the tear seam 36 is torn in the airbag deployment sequence.

As shown in FIG. 12, these delay mechanisms are shown as part of the second portion 34 of the device 18 and temporarily couple the second portion 34 to first portion 33. In an alternative embodiment these delay mechanisms may be located elsewhere on the device 18 (e.g., the mechanisms may be located on the first portion of the device), depending on application requirements (e.g., deployment direction of the airbag, desired amount of delay before the main tear seam is torn, etc.).

As discussed above, the tabs 40 are part of the second portion 34 of the device 18. Alternatively, the tabs may be sewn or otherwise coupled to the second portion 34. Tabs 40 are stitched, glued or otherwise coupled to the first portion 33. Thus, second portion 34 is coupled to first portion 33.

Tabs 40 delay the tearing of tear seam 36 by providing a resistance to the extension of the device 18. The force of the inflating airbag will cause tabs 40 to tear at the smallest cross-sectional width dimension of the tab 40. Varying the cross-sectional width of tabs 40 adjusts the amount of delay before the tear seam 36 is torn, as discussed in more detail below.

As discussed above, stitches 42 may be located on second portion 34 and temporarily couple second portion 34 to first portion 33. Alternatively, the stitches may be located on first portion and temporarily couple first portion to second portion. Stitches 42 may be sewn parallel, perpendicular or in any other direction with respect to tear seam 36.

Stitches 42 delay the tearing of tear seam 36 by providing a resistance to the extension of the device 18. The force of the inflating airbag will cause stitches 42 to become unstitched (e.g., torn, ripped, etc.). Varying the type and strength of the thread material used, the length of the stitches 42, and the type of stitch 42 adjusts the amount of delay before the tear seam 36 is torn, as discussed in more detail below.

A fully assembled airbag system or assembly 10 can be seen in FIG. 7. The device 18 is provided in the airbag assembly 10 such that it is proximate or adjacent to the airbag 12. According to an exemplary embodiment, the device 18 overlays a portion of the center of the airbag 12. According to another exemplary embodiment, the device 18 is provided in contact with the center of the airbag 12 and remains in contact with the airbag 12 during initial deployment of the airbag 12. According to an exemplary embodiment, the device 18 may be used to alter or modify the direction of inflation or deployment of the airbag 12.

Figure 8:
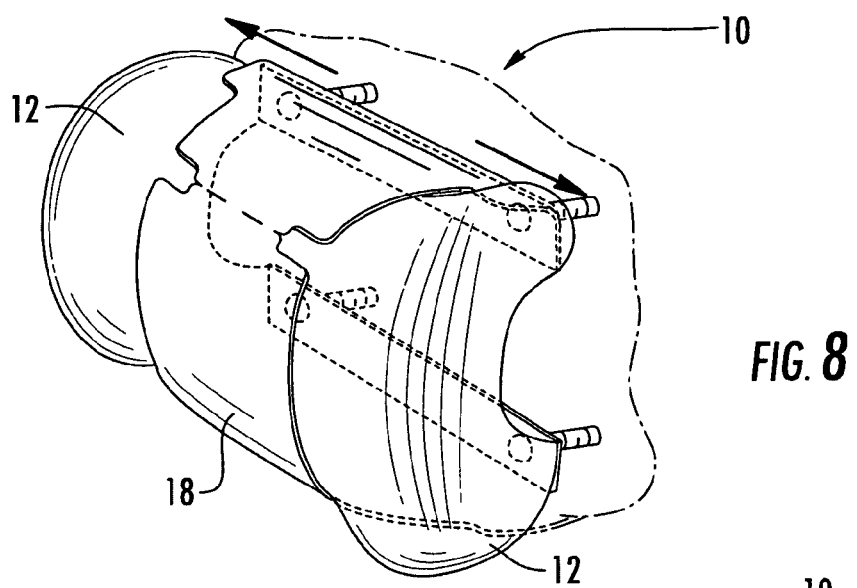
FIG. 8 is a perspective view of the airbag assembly shown in FIG. 7 showing the initial deployment of the airbag.
Figure 9:
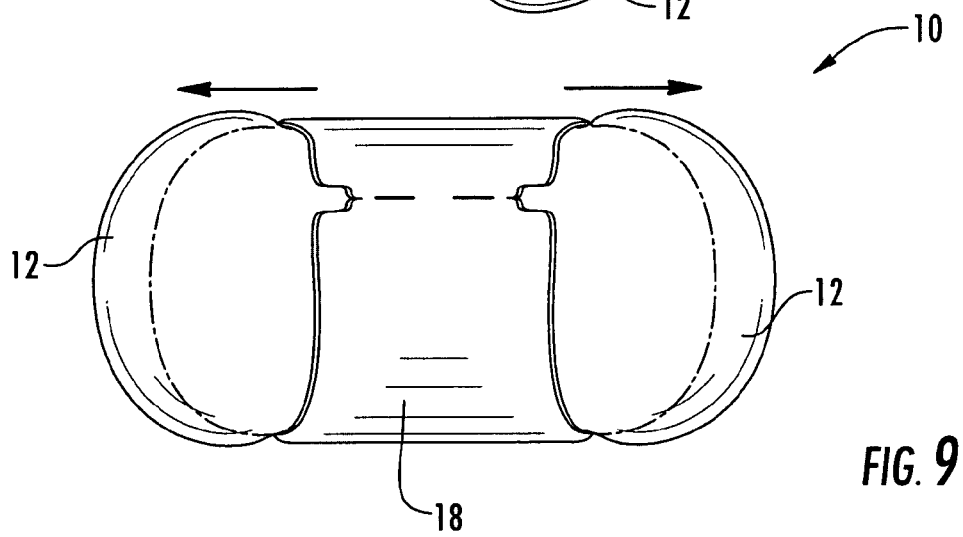
FIG. 9 is a front view of the airbag assembly shown in FIG. 8.

FIGS. 8-11 illustrate the deployment of the airbag 12 in the airbag assembly 10 utilizing the device 18 as described above. As shown in FIG. 8, the system 10 is provided such that the device 18 is proximate or adjacent to a portion of the center of the airbag 12. When the airbag 12 initially deploys, the device 18 acts upon the airbag 12 to restrain or retard outward expansion, deployment, or inflation of the airbag 12 in the location of the device 18. FIGS. 8 and 9 illustrate that for the initial period of inflation, the airbag 12 deploys or inflates laterally or transversely to the direction in which it would normally expand (e.g., in the direction of a vehicle occupant). During this initial period, the device 18 remains in place proximate or adjacent the center portion of the airbag 12.

Figure 10:
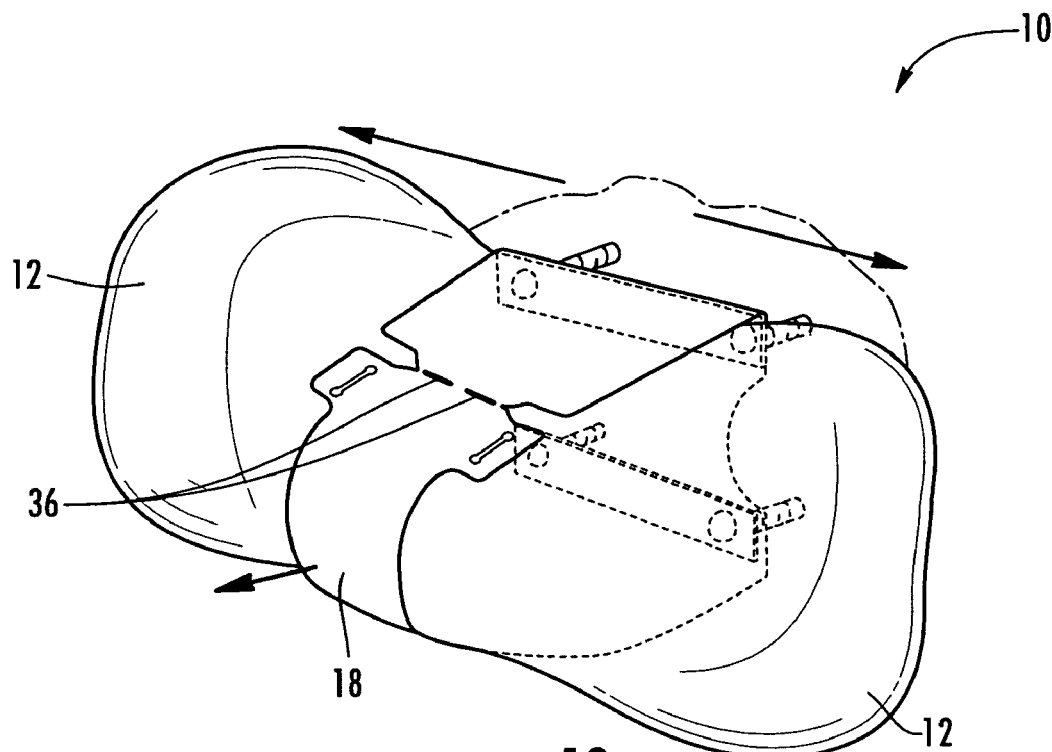
FIG. 10 is a perspective view of the airbag assembly shown in FIG. 7 after further deployment of the airbag.
Figure 11:
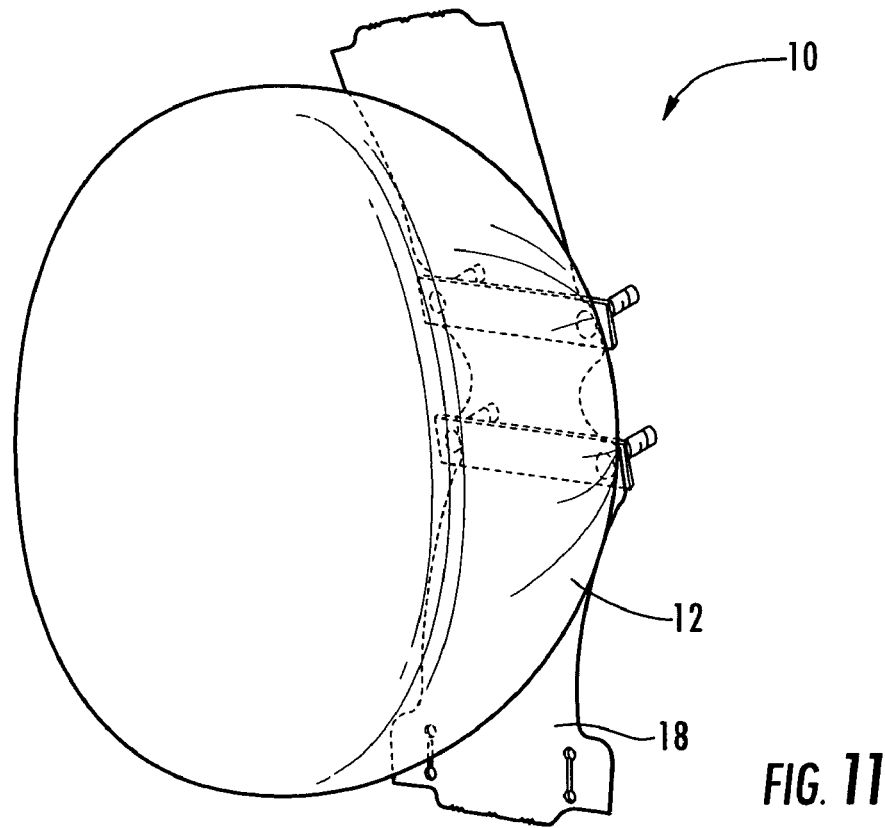
FIG. 11 is a perspective view of the airbag assembly shown in FIG. 7 illustrating separation of the member or device with still further deployment of the airbag.

At a certain point in the inflation of the airbag 12, the force generated by expansion of the airbag 12 will overcome the tear seams 32 located between the second set of holes 30 near the middle of the device 18. It should be understood that the tear seams 32 may be torn almost immediately upon deployment of the airbag 12 thus causing no or almost no lateral deployment inflation of the airbag 12. Alternatively, the tear seams 32 may be torn at a later point in time allowing more lateral deployment or inflation of the airbag 12 in a direction lateral to the vehicle occupant. Once the tear seams 32 located between the second set of holes 30 near the middle of the device 18 are torn, as shown in FIG. 10, the device 18 may then fully extend and the airbag 12 may then expand in a direction toward the vehicle occupant. According to an exemplary embodiment, the tear seams 32 are torn after a period of between approximately 3 and 10 milliseconds after initial deployment of the airbag 12. According to other exemplary embodiments, the tear seams 32 may be torn sooner than 3 milliseconds or later than 10 milliseconds after initial deployment of the airbag 12.

The airbag 12 will expand in a direction toward the vehicle occupant up until the airbag 12 again comes in contact with the now fully extended device 18. Once the airbag 12 comes in contact with the fully extended device 18, the airbag 12 will again deploy or inflate in a direction lateral or transverse the vehicle occupant (i.e. transverse the normal direction). At a certain point in inflation, the airbag force generated by expansion of the airbag 12 will overcome the main tear seam 36 of the device 18 (i.e. the main tear seam 36 will be torn) allowing the airbag 12 to then deploy or inflate in its normal direction towards the occupant of the vehicle until the airbag is fully inflated. According to an exemplary embodiment, the tear seam 36 is torn after a period of between approximately 12 and 20 milliseconds after initial deployment of the airbag 12. According to other exemplary embodiments, the tear seam 36 may be torn sooner than 12 milliseconds or later than 20 milliseconds after initial deployment of the airbag 12.

As stated above, optional mechanisms (e.g., tabs 40, stitching 42, etc.) for delaying the extension of the device 18 and the tearing of tear seam 36 may be utilized in airbag assembly 10. Depending on the desired deployment characteristics of the airbag assembly 10, the amount of delay may be varied by adjusting certain features or characteristics of the delay mechanisms.

For example, tabs 40 may be used with a relatively thin cross-section area so that the deployment of the device 18 (and thus the tearing of main tear seam 36) occurs relatively shortly after the tear seams 32 are torn. Alternatively, tabs having a wider cross-section may be employed in the airbag assembly thus causing a longer period of delay between the tearing of tear seams 32 and the main tear seam 36.

Additionally and/or alternatively, stitching 42 may be included on the airbag assembly 10 to accomplish similar characteristics (to delay tearing of the main tear seam 36 after the tear seams 32 are torn, to optimize deployment direction of the airbag 12, etc.). Stitching 42 may employ a relatively thin thread for a short delay or a relatively thicker thread for a long delay. Additionally, stitching 42 may be instituted over a shorter or longer section of device 18 depending on the desired deployment characteristics of the airbag assembly 10.

As shown in the Figures, the device may be used to control the trajectory and stability of the airbag during airbag deployment. The device may also reduce the cushion pressure faced by out-of-position occupants. Utilizing the device provides a soft interaction between the out-of-position occupant and the deploying airbag. The device allows for optimal interaction between out-of-position occupants and the deploying airbag. The device reduces the pressure of the deploying cushion, ultimately decreasing loading of an occupant's head and neck. At full inflation, the airbag provides exceptional performance for in-position occupants.

For the purpose of this disclosure, the terms "coupled," "connected," and the like mean the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the airbag assembly as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. Other substitutions, modifications, changes and omissions may be made in the design, operating conditions and arrangement of the preferred and other exemplary embodiments without departing from the scope of the present inventions as expressed in the appended claims.

What is claimed is:

1. An airbag assembly for protecting a vehicle occupant comprising:
   an airbag;
   a deployment control device provided adjacent at least a portion of the airbag and having first and second tear seams, the first tear seam extending in a width direction of the device, and the second tear seam extending perpendicular to the first tear seam and extending in a longitudinal direction of the device,
   wherein the device is configured to restrain deployment of the airbag toward the occupant thereby causing the airbag to inflate laterally with respect to the occupant until the first tear seam is torn by the force of the inflating airbag, and
   wherein the second tear seam is torn by inflation of the airbag before the first tear seam is torn.

2. The airbag assembly of claim 1, wherein the airbag inflates in a direction towards the vehicle occupant before being restrained by the device.

3. The airbag assembly of claim 2, wherein the airbag inflates in a direction towards the vehicle occupant for a predetermined distance before being restrained by the device.

4. The airbag assembly of claim 3, wherein the device comprises a first portion having a first width and a second portion adjacent the first portion and having a length and a second width different than the first width, wherein the length determines the distance the airbag deploys toward the occupant before the airbag is restrained by the device.

5. The airbag assembly of claim 4, wherein the device includes a third tear seam, and wherein the second and third tear seams are torn by inflation of the airbag which allows the airbag to extend a limited amount in a direction towards a vehicle occupant, and wherein the second and third tear seams are torn by inflation of the airbag before the first tear seam is torn.

6. The airbag assembly of claim 5, wherein initial inflation of the airbag is in a direction lateral the vehicle occupant until the second and third tear seams are torn.

7. The airbag assembly of claim 1, wherein the airbag is folded and the device is approximately centered over the folded airbag prior to inflation of the airbag.

8. A system for controlling an airbag toward a vehicle occupant comprising:
   a deployment control device having a first end coupled to an airbag module and a second end opposite of the first end coupled to the airbag module;
   a first tear seam located on the device between the first end and the second end thereof, the first tear seam extending in a width direction of the device; and
   a second tear seam located on the device, the second tear seam extending perpendicular to the first tear seam and extending in a longitudinal direction of the device,
   wherein initial inflation of the airbag is towards a vehicle occupant until the airbag is restrained by the device,
   wherein further inflation of the airbag is laterally with respect to the occupant until the first tear seam is torn, and
   wherein the second tear seam is torn by inflation of the airbag thereby allowing the airbag to extend a limited amount in a direction towards the occupant, wherein the second tear seam is torn by inflation of the airbag before the first tear seam is torn.

9. The system of claim 8, wherein the airbag inflates in a direction towards the vehicle occupant for a predetermined distance before being restrained by the device.

10. The system of claim 8, wherein the airbag inflates towards the vehicle occupant after the first tear seam is torn.

11. The system of claim 8, wherein the device further comprises a first portion having a first width and a second portion adjacent the first portion and having a length and a second width different than the first width, wherein the length determines the distance before the airbag is acted upon by the device.

12. The system of claim 8, wherein the device includes a third tear seam, and wherein initial inflation of the airbag is in a direction lateral the vehicle occupant until the second and third tear seams are torn allowing the device to fully extend and the airbag to inflate in a normal direction.

13. An airbag module for protecting a vehicle occupant comprising:
   a folded airbag;
   a deployment control device wrapped around a central portion of the airbag to restrain deployment of the airbag in a direction toward the occupant;
   wherein the deployment control device includes first and second tear seams, the first tear seam extending in a width direction of the device, and the second tear seam extending perpendicular to the first tear seam and extending in a longitudinal direction of the device,
   wherein the device is configured so that the second tear seam tears as a result of the deploying airbag and after the second tear seam tears the deployment of the airbag remains restrained until the first tear seam tears allowing unrestricted deployment of the airbag.

14. The module of claim 13, further comprising a third tear seam configured to tear at approximately the same time as the first tear seam.

15. The module of clam 13, wherein the deployment control device comprises fabric and is configured so that when the second tear seam tears, the device separates into at least two parts.

16. The module of claim 13, wherein the deployment control device is folded and wherein the first tear seam maintains the folded configuration of the device.

17. The module of claim 16, wherein the device is configured so that when the first tear seam tears the device unfolds.

18. The module of claim 13, wherein the device includes a mechanism for delaying the tearing of the second tear seam.

19. The module of claim 18, wherein the mechanism is at least one of a tab and a stitching.

20. The module of claim 13, wherein initial inflation of the airbag is towards a vehicle occupant until the airbag is restrained by the device.

21. The module of claim 20, wherein further inflation of the airbag is laterally with respect to the occupant until the first tear seam is torn.

* * * * *